(12) United States Patent
Coto

(10) Patent No.: US 9,815,630 B1
(45) Date of Patent: Nov. 14, 2017

(54) DIRECT-DRIVE SPIRAL CONVEYOR

(71) Applicant: Laitram, L.L.C., Harahan, LA (US)

(72) Inventor: Oscar R. Coto, New Orleans, LA (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 15/224,809

(22) Filed: Aug. 1, 2016

(51) Int. Cl.
  *B65G 21/18* (2006.01)
  *B65G 21/16* (2006.01)
  *B65G 21/00* (2006.01)

(52) U.S. Cl.
  CPC .......... *B65G 21/18* (2013.01); *B65G 2207/24* (2013.01)

(58) Field of Classification Search
  None
  See application file for complete search history.

(56) References Cited

U.S. PATENT DOCUMENTS

| | | | |
|---|---|---|---|
| 3,348,659 | A | 10/1967 | Roinestad |
| 4,450,953 | A | 5/1984 | LeCann et al. |
| 4,852,720 | A | 8/1989 | Roinestad |
| 4,944,162 | A | 7/1990 | Lang et al. |
| 5,105,934 | A | 4/1992 | Cawley |
| 5,139,135 | A | 8/1992 | Irwin et al. |
| 8,181,771 | B2 | 5/2012 | Talsma et al. |
| 8,302,764 | B2 * | 11/2012 | Johnson ............ B65G 21/18 198/778 |
| 2013/0213773 | A1 | 8/2013 | Talsma et al. |
| 2015/0047952 | A1 | 2/2015 | Talsma et al. |

FOREIGN PATENT DOCUMENTS

| | | |
|---|---|---|
| EP | 1586518 B1 | 8/2006 |
| JP | 2007-131359 A | 5/2007 |
| KR | 10-0916599 B1 | 9/2009 |

OTHER PUBLICATIONS

"Intralox Spiral Technologies: The DirectDrive System," Intralox, L.L.C., Harahan, LA 70123, U.S.A., 2012.
International Search Report and Written Opinion of the International Searching Authority, PCT/US2017/040451, dated Sep. 28, 2017, Korean Intellectual Property Office.

* cited by examiner

*Primary Examiner* — Kavel Singh
(74) *Attorney, Agent, or Firm* — James T. Cronvich

(57) ABSTRACT

A direct-drive spiral conveyor and a method for operating a spiral conveyor in which a sideflexing conveyor belt is positively driven in a helical path about the periphery of a rotating cylindrical drive drum. Parallel drive members extend in length along the periphery from the top to the bottom of the drive drum. The drive members engage drive faces on the inside edge of the conveyor belt and positively drive the inside edges along the helical path. The helical path is steeper at the entrance end—the bottom in an upgoing spiral, the top in a downgoing spiral—than at the opposite exit end and along a majority of the path.

11 Claims, 3 Drawing Sheets

DIRECT-DRIVE SPIRAL CONVEYOR

BACKGROUND

The invention relates generally to power-driven conveyors and more particularly to direct-drive spiral conveyors and methods for their operation.

In drum-driven spiral conveyors a conveyor belt is driven in a helical path winding up or down the periphery of a rotating cylindrical drive drum, or tower. In so-called low-friction spiral conveyors, the periphery of the drive drum frictionally engages the inside edge of the belt to drive it along the helical path. The drum rotates at a greater angular speed than the belt. In other words the drive drum is overdriven, and the belt slips relative to the drum. The constant slipping of the belt causes vibrations in the belt that can change the orientations of conveyed products. The drive drum of a direct-drive, or positive-drive, spiral conveyor has vertical drive bars spaced apart around the drum's periphery. The drive bars positively engage the inside edges of the conveyor belt and drive it along its helical path without slip and with less belt vibration.

The tension in a long spiral conveyor belt can be quite high. One way tension in a direct-drive spiral belt is reduced is with a drive drum having a greater diameter at the entrance of the belt onto the drum than along the remainder of its helical path about the drum. The large-diameter portion of the drum causes the belt to stretch upon entry. Then, as the belt makes its way to the smaller-diameter portion of the drum, the belt, like a rubber band, relaxes somewhat, and its tension decreases. Putting a large-diameter portion on a drive drum requires that all the drive bars be built out radially along a portion of their lengths near the entry to the drum.

SUMMARY

One version of a spiral conveyor embodying features of the invention comprises a drive drum extending from a bottom to a top and having a cylindrical periphery rotatable about a vertical axis. Parallel drive members extend in length along the cylindrical periphery of the drive drum from the bottom to the top. A helical carryway supports a conveyor belt positively driven at an inside edge by engagement with the drive members and defines a helical path for the conveyor belt about the periphery of the drive drum from the bottom to the top. The helical carryway extends from an entrance end at the top for a downgoing spiral conveyor and at the bottom for an upgoing spiral conveyor to an exit end at the bottom for a downgoing spiral conveyor and at the top for an upgoing spiral conveyor. The helical path is steeper at the entrance end than at the exit end.

In another aspect of the invention, a method for operating a spiral conveyor belt comprises: (a) rotating a cylindrical drive drum about a vertical axis; (b) positively engaging the inner edge of a sideflexing conveyor belt with parallel drive members on the cylindrical drive drum; and (c) driving the sideflexing conveyor belt up or down a helical path about the drive drum from an entrance end of the helical path to an exit end, wherein the helical path is steeper at the entrance end than at the exit end.

DETAILED DESCRIPTION

Figure 1:
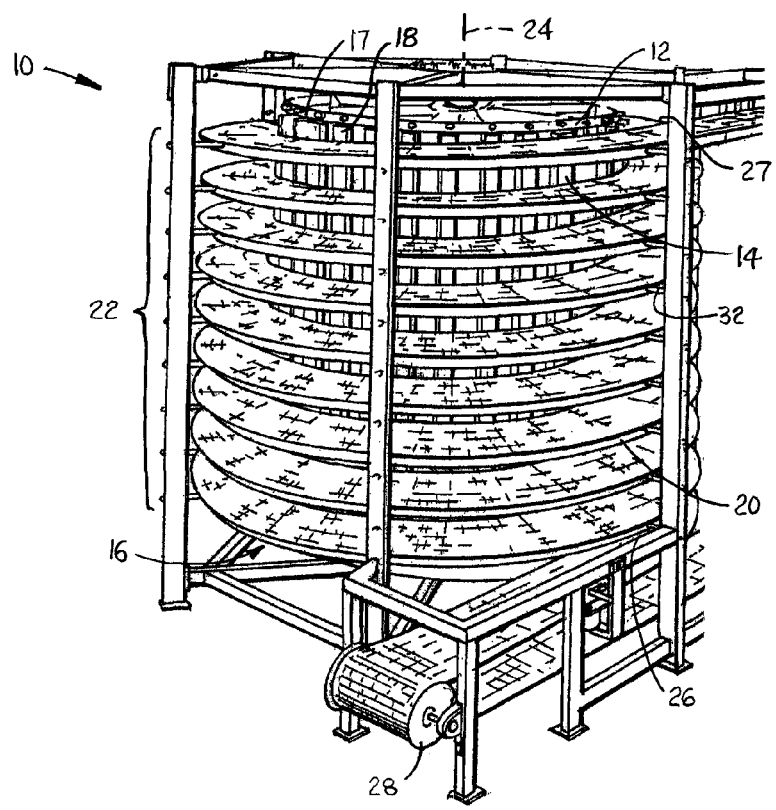
FIG. 1 is an isometric view of a spiral conveyor embodying features of the invention.

A spiral conveyor embodying features of the invention is shown in FIG. 1. The spiral conveyor 10 includes a drive tower 12, or drum, with a cylindrical outer periphery 14 that extends from a bottom 16 to a top 17. Parallel drive members 18 extend in length along the periphery 14 of the drive drum 12 from the bottom 16 to the top 17. The drive members 18 extend radially outward from the periphery 14. A pair of parallel wearstrips 20 (only the outer wearstrip is shown) mounted to a tier support 32 form a helical carryway 22 about the drive drum 12. The helical carryway 22 defines a multi-tiered helical path about the periphery 14 of the drive drum 12 for a sideflexing conveyor belt 30 supported on the wearstrips 20. The drive drum 12 is driven to rotate about a vertical axis 24 parallel to the lengths of the drive members 18 as in FIG. 1. But the drive members could alternatively be arranged in parallel at an angle oblique to the vertical axis 24. The drive members 18 positively engage the inside edge of a conveyor belt to drive it along the helical path 22. In this example the spiral conveyor 10 is an upgoing spiral for which the belt enters the helical path at an entrance end 26 of the carryway 22 at the bottom 16 and exits at an exit end 27 at the top 17. In a downgoing spiral the entrance end is at the top 17 and the exit end is at the bottom 16. The belt exiting the spiral conveyor 10 passes around takeup sprockets (not shown) and return rollers 28 as it makes its way back to the entrance end 26. The drive drum 12 and the takeup sprockets are conventionally driven by motors (not shown).

Figure 2:
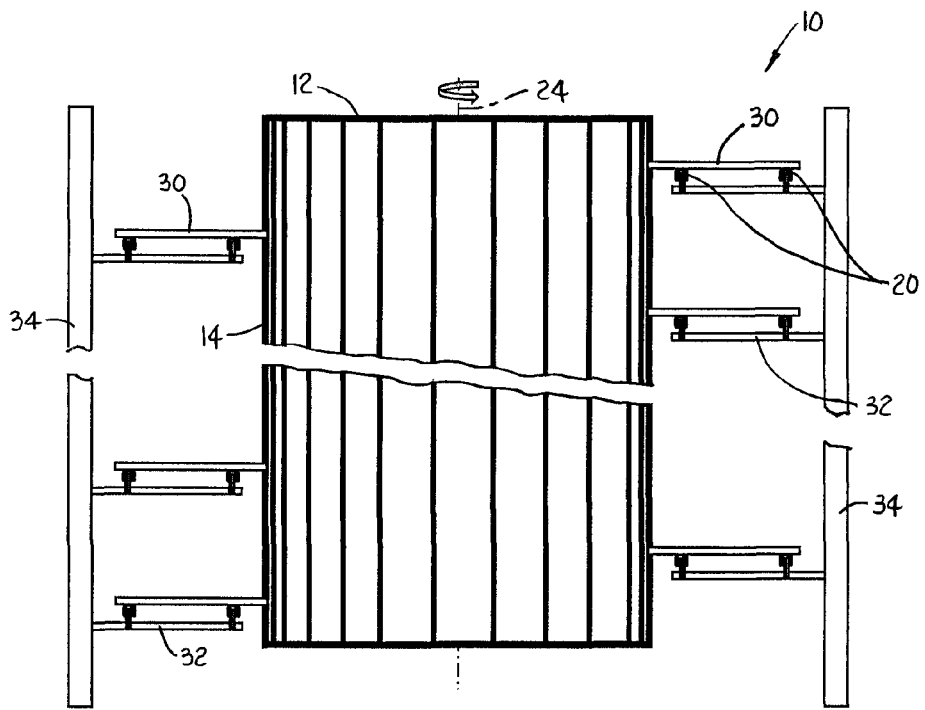
FIG. 2 is a vertical cross section of a spiral conveyor such as the conveyor in FIG. 1.

As shown in FIG. 2, the conveyor belt 30 is supported atop the wearstrips 20, which extend upward from the tier supports 32 attached to a frame 34. The tier supports 32 are arranged to form the helical carryway 22 and define the multi-tiered helical path about the periphery 14 of the drive drum 12.

Figure 3:
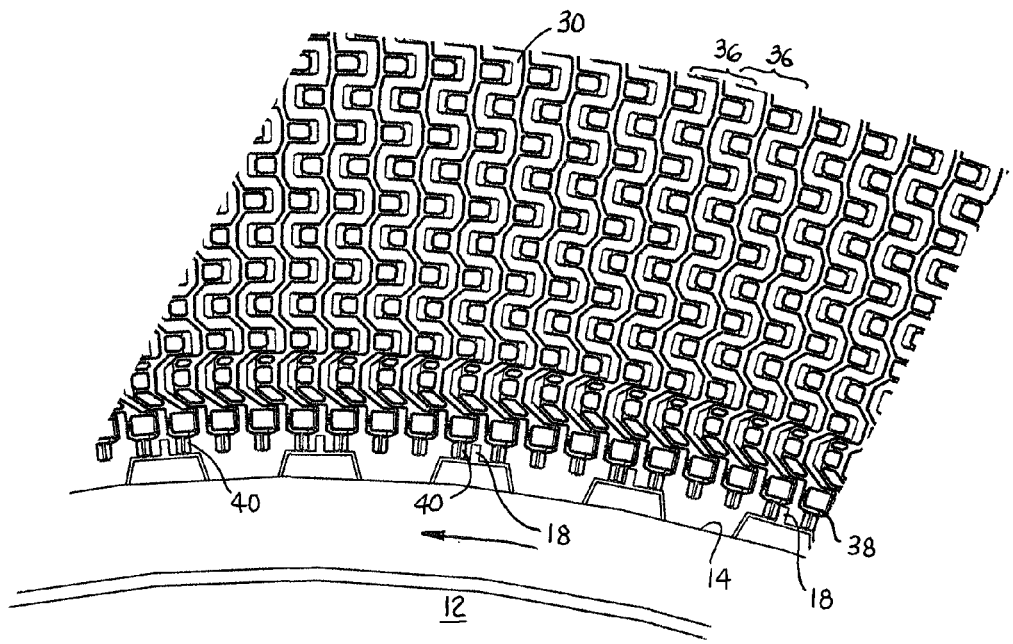
FIG. 3 is a schematic plan view of a portion of one tier of a spiral conveyor as in FIG. 1.

As illustrated schematically in FIG. 3, the conveyor belt 30 is a sideflexing belt constructed of a series of rows 36 of belt modules. The rows 36 at an inner edge 38 of the belt 30 collapse together at the inside of the turn around the drive drum 12. The drive members 18 extending outward from the drum's periphery 14 positively engage drive faces 40 on the inner edge 38 of the belt 30 and drive the belt along the helical path. Because the drive members 18 are circumferentially spaced from each other, not every belt row 36 engages a drive member directly. But a drive face 40 engaged by a drive member 18 in the belt's entry into the spiral conveyor 10 remains engaged with that drive member from the belt's entry to its exit from the drive drum 12. Thus, there is no overdrive, and the belt 30 doesn't slip relative to the drive drum 12. The angular speeds of the belt 30 and the drive drum about the vertical axis 24 are the same.

Figure 4:
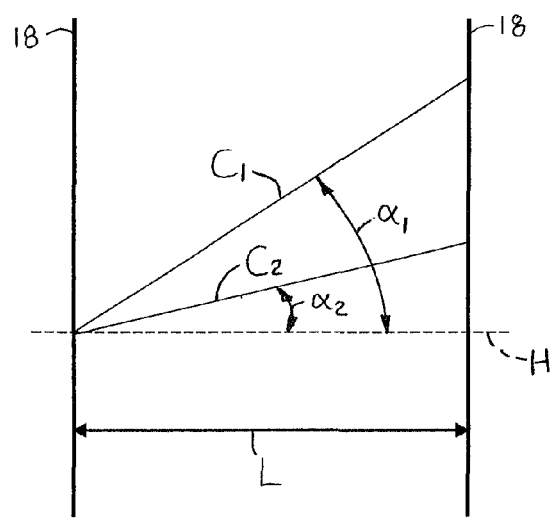
FIG. 4 is a diagram illustrating the effect of changing the lead angle on belt stretch.

FIG. 4 shows the distances between consecutive parallel drive members 18 along helical paths at different lead angles α. The lead angle is defined as the angle α that the helical path makes with a perpendicular to the vertical axis of rotation. In this example the perpendicular is a horizontal plane H. All the distances depicted in FIG. 4 actually represent arc lengths along the periphery of the drive drum. The arc length on the periphery of the drive drum between consecutive drive members 18 is given by L=rθ, where r is the radius of the drive members' circular path, which is just slightly greater than the radius of the drive drum, and θ is the central angle between consecutive drive members in radians. The arc length $C_1$ between consecutive drive members 18 measured on a helical path with a lead angle $\alpha_1$ is given by $C_1$=L/cos $\alpha_1$. Thus, $C_1$>L. And on a shallower helical path, $C_2$=L/cos $\alpha_2$. If the same number of belt rows are confined between consecutive drive bars irrespective of the lead angle of the helical path, the belt will be stretched to a greater extent on greater lead angles because the arc length C increases with lead angle. More precisely, the arc length C is proportional to the secant of the lead angle $\alpha$. And, like a rubber band, a conveyor belt has more tension when stretched. So, by decreasing the lead angle $\alpha$ of the helical path from $\alpha_1$ to $\alpha_2$, the belt is relaxed and tension is reduced.

Figure 5:
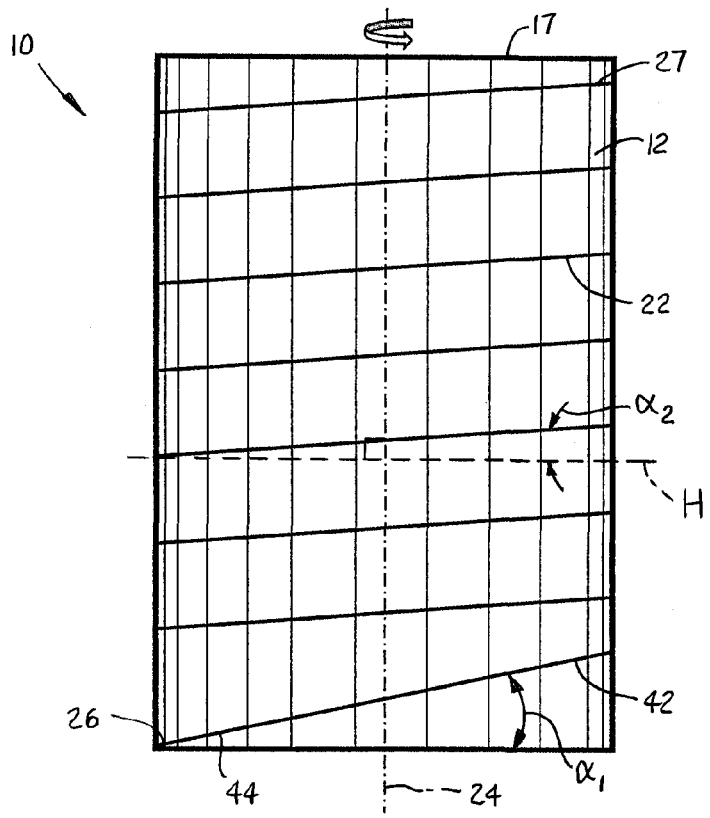
FIG. 5 is a schematic of a spiral conveyor as in claim 1 with a steep entry at the bottom.

The arrangement of the helical carryway 22 around the drive drum 12 is shown in FIG. 5. As shown for an upgoing spiral conveyor 10, the helical path 42 defined by the carryway is steeper at the entrance end 26 at the bottom 16 of the drive drum than at the exit end 27 at the top 17. In other words the lead angle $\alpha_1$ of the helical path 42 at the entrance end 26 is greater than the lead angle $\alpha_2$ along the majority of the helical path up to the exit end 27. As the drum rotates about its vertical axis of rotation 24, the conveyor belt on at least a portion of the lowest tier 44 of the carryway 22 is stretched more than on the remaining tiers. In that way the belt is relaxed and under less tension on the majority of the helical path 42.

Figure 6:
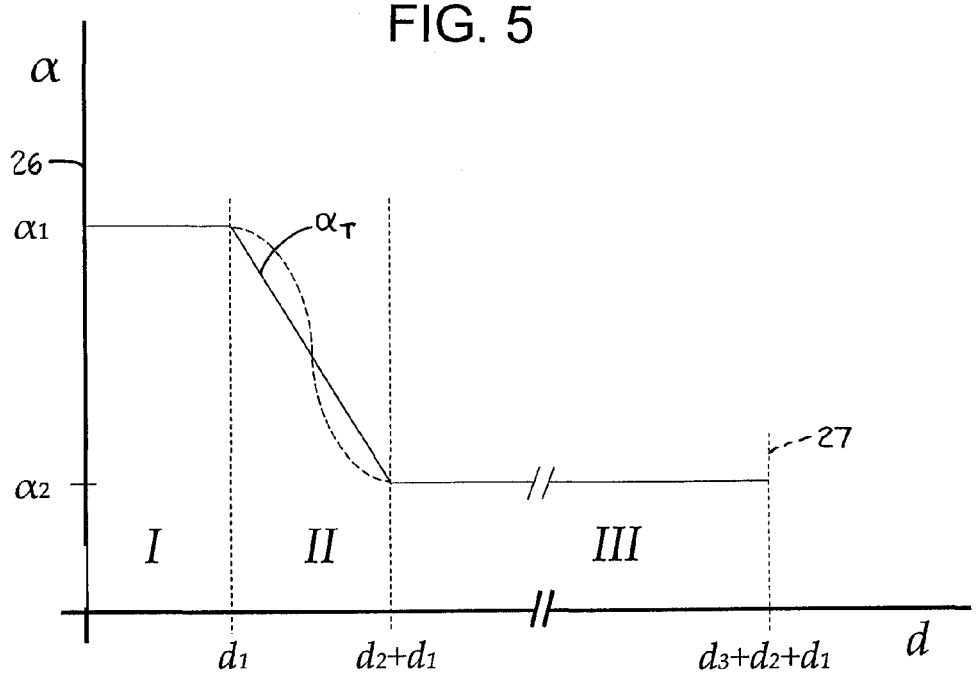
FIG. 6 is a graph showing the lead angle as a function of distance along the helical path for a spiral conveyor as in FIG. 5.

One example of the relationship of the lead angle $\alpha$ of the helical path 42 is shown graphically in FIG. 6. The lead angle $\alpha$ of the helical path in a first segment I extending from the entrance end of the helical path a distance $d_1$ is a first constant lead angle $\alpha_1$. (The distance d represents a distance along the helical path.) The first segment I of the helical path extends for a distance $d_1$ to a second segment II, which extends from the first segment for a distance $d_2$ to a third segment III. The lead angle $\alpha$ of the helical path in the third segment is at a constant second lead angle $\alpha_2$, where $\alpha_2 < \alpha_1$. The third segment III extends from the second segment II a distance $d_3$ to the exit end of the helical carryway. The lead angle at decreases monotonically in the transitional second segment II from $\alpha_1$ at the first segment I to $\alpha_2$ at the third segment III. The monotonic variation may be linear as indicated by the solid line or nonlinear as indicated by the dashed line. In general the third segment III is much longer than the first two segments I, II; i.e., $d_3 \gg d_2 + d_1$. The first two segments I, II are shown in FIG. 5 as extending only along a portion of the lowest tier, or less than 360° around the periphery of the drive drum 12.

It would be possible to arrange the lead angle of the helical path in other ways to reduce tension in the belt. As just one example, the first segment I at the first constant lead angle $\alpha_1$ could be eliminated ($d_1$=0) so that the lead angle $\alpha$ of the helical path constantly decreases from $\alpha_1$ at the entrance end to the constant $\alpha_2$ along the major portion of the helical path in the third segment III to the exit end.

What is claimed is:

1. A spiral conveyor comprising:
   a drive drum extending from a bottom to a top and having a cylindrical periphery rotatable about a vertical axis;
   a plurality of parallel drive members extending in length along the cylindrical periphery of the drive drum from the bottom to the top;
   a helical carryway for supporting a conveyor belt positively driven at an inside edge by engagement with the drive members and defining a helical path for the conveyor belt about the periphery of the drive drum from the bottom to the top;
   wherein the helical carryway extends from an entrance end at the top for a downgoing spiral conveyor and at the bottom for an upgoing spiral conveyor to an exit end at the bottom for a downgoing spiral conveyor and at the top for an upgoing spiral conveyor;
   wherein the helical path is steeper at the entrance end than at the exit end.

2. A spiral conveyor as in claim 1 wherein the helical path has a first segment that extends from the entrance end for a first distance to a second segment that extends from the first segment for a second distance to a third segment that extends for a third distance to the exit end and wherein the helical path forms a lead angle at every point along the helical path, wherein the lead angle is a first constant angle in the first segment and a smaller second constant angle in the third segment and wherein the lead angle decreases monotonically in the second segment from the first constant angle at the first segment to the second constant angle at the third segment.

3. A spiral conveyor as in claim 2 wherein the third distance is greater than the sum of the first and second distances.

4. A spiral conveyor as in claim 2 wherein the helical path encompassing the first and second segments extends less than 360° about the cylindrical periphery of the drive drum.

5. A spiral conveyor as in claim 1 wherein the parallel drive members are parallel to the vertical axis.

6. A spiral conveyor as in claim 1 comprising a sideflexing conveyor belt supported on the helical carryway and having drive faces at an edge of the belt adjacent the drive drum engaged by the drive members in driving engagement to advance the conveyor belt along the helical path.

7. A spiral conveyor as in claim 1 wherein the helical path has a constant steepness along a majority of the helical path.

8. A spiral conveyor as in claim 1 wherein the helical path forms a lead angle at every point along the helical path, wherein the lead angle decreases along a portion of the helical path starting at the entrance end from a lead angle $\alpha_1$ to a smaller lead angle $\alpha_2$ and is constant along a major portion of the helical path to the exit end at the smaller lead angle $\alpha_2$.

9. A method for operating a spiral conveyor, the method comprising:
   rotating a cylindrical drive drum about a vertical axis;
   positively engaging the inner edge of a sideflexing conveyor belt with parallel drive members on the cylindrical drive drum;
   driving the sideflexing conveyor belt up or down a helical path about the drive drum from an entrance end of the helical path to an exit end, wherein the helical path is steeper at the entrance end than at the exit end.

10. A method as in claim 9 wherein driving the sideflexing conveyor belt up or down the helical path includes driving the sideflexing conveyor belt on the helical path along a constant steepness portion extending along a majority of the helical path.

11. A method as in claim 9 wherein driving the sideflexing conveyor belt up or down the helical path includes driving the sideflexing conveyor belt on the helical path along a constant steepness portion that includes the entrance end.

\* \* \* \* \*

UNITED STATES PATENT AND TRADEMARK OFFICE
CERTIFICATE OF CORRECTION

PATENT NO. : 9,815,630 B1  
APPLICATION NO. : 15/224809  
DATED : November 14, 2017  
INVENTOR(S) : Oscar R. Coto Page 1 of 1

It is certified that error appears in the above-identified patent and that said Letters Patent is hereby corrected as shown below:

Column 3, Line 41, delete "at" and substitute --$\alpha_T$--.

Signed and Sealed this  
Twentieth Day of February, 2018

Andrei Iancu  
*Director of the United States Patent and Trademark Office*